(12) United States Patent
Szasz

(10) Patent No.: US 9,311,565 B2
(45) Date of Patent: Apr. 12, 2016

(54) 3D SCANNING WITH DEPTH CAMERAS USING MESH SCULPTING

(71) Applicant: Sony Corporation, Tokyo (JP)

(72) Inventor: Pal Szasz, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/305,563

(22) Filed: Jun. 16, 2014

(65) Prior Publication Data

US 2015/0363665 A1 Dec. 17, 2015

(51) Int. Cl.
| | |
|---|---|
| G06K 9/00 | (2006.01) |
| G06K 9/52 | (2006.01) |
| G06T 7/00 | (2006.01) |
| G06T 7/40 | (2006.01) |
| G06K 9/46 | (2006.01) |
| H04N 13/02 | (2006.01) |

(52) U.S. Cl.
CPC ............... *G06K 9/52* (2013.01); *G06K 9/4604* (2013.01); *G06K 9/4652* (2013.01); *G06T 7/0051* (2013.01); *G06T 7/408* (2013.01); *H04N 13/0203* (2013.01)

(58) Field of Classification Search
None
See application file for complete search history.

(56) References Cited

U.S. PATENT DOCUMENTS

| | | | | |
|---|---|---|---|---|
| 6,009,188 A * | 12/1999 | Cohen | ..................... | G06T 15/50 345/419 |
| 7,643,025 B2 * | 1/2010 | Lange | ..................... | G02B 27/22 345/419 |
| 2005/0052452 A1 * | 3/2005 | Baumberg | ............ | G06T 7/0067 345/419 |
| 2015/0178988 A1 * | 6/2015 | Montserrat Mora | .... | G06T 13/40 345/420 |

OTHER PUBLICATIONS

International Search Report and Written Opinion issued for the corresponding international application No. PCT/IB2014/066896 mailed on Apr. 30, 2015, 10 pages.
Grosso et al.: "3-D Object Reconstruction Using Stereo and Motion," IEEE Transactions on Systems, Man and Cybernetics, IEEE Inc., New York, US, vol. 19, No. 6, Nov. 1, 1989, pp. 1465-1476.
Esteban et al.: "Multi-stereo 3D Object Reconstruction," 3D Data Processing Visualization and Transmission, 2002. Proceedings. First International Symposium on Jun. 19-21, 2002, Piscataway, NJ, USA, IEEE, Los Alamitos, CA, USA, Jun. 19, 2002, pp. 159-166.
Birkbeck et al.: "Object Centered Stereo: Displacement Map Estimation Using Texture and Shading," Third International symposium on 3D Data Processing, Visualization, and Transmission (3DPVT'06), Jun. 1, 2006, pp. 790-797.
Li Zhang: "Image-Based Multiresolution Modeling by Surface Deformation," 2002. Retrieved from the Internet: URL: http://www.cs.cmu.edu/afs/cs/usr/lizhang/homepage/research/ibm/zhang-CVPR00-submit.pdf [retrieved on Mar. 23, 2015].

* cited by examiner

Primary Examiner — David F Dunphy
(74) Attorney, Agent, or Firm — Tucker Ellis LLP

(57) ABSTRACT

A method, performed by a mobile communication device, may include capturing one or more images from a depth camera, wherein the one or more images include depth information. The method may further include generating an initial sculpture for an entity in the captured one or more images; performing a ray casting process on the generated initial sculpture using the depth information; and deforming the initial sculpture based on the ray casting process to generate a sculpture for the entity.

18 Claims, 14 Drawing Sheets

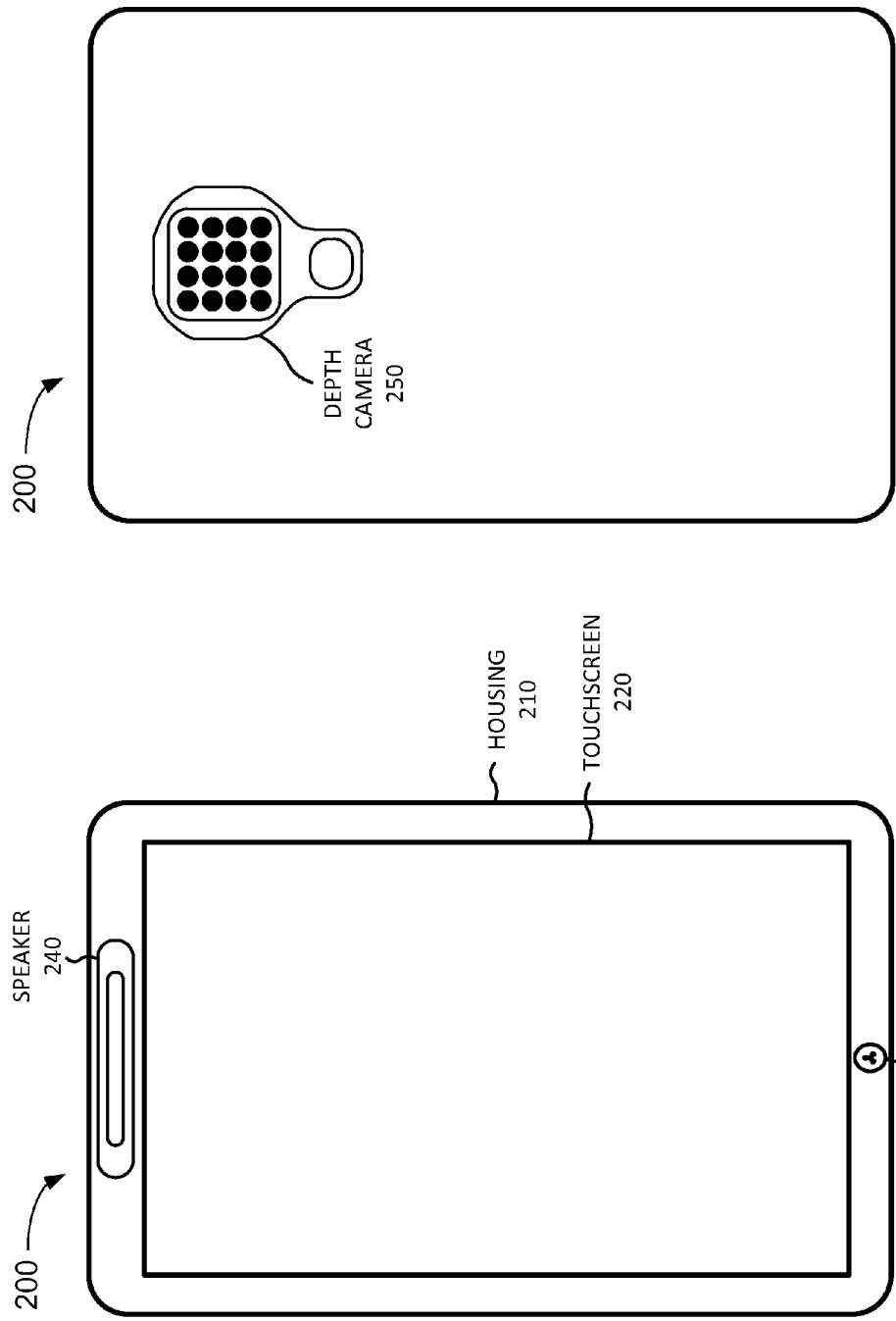

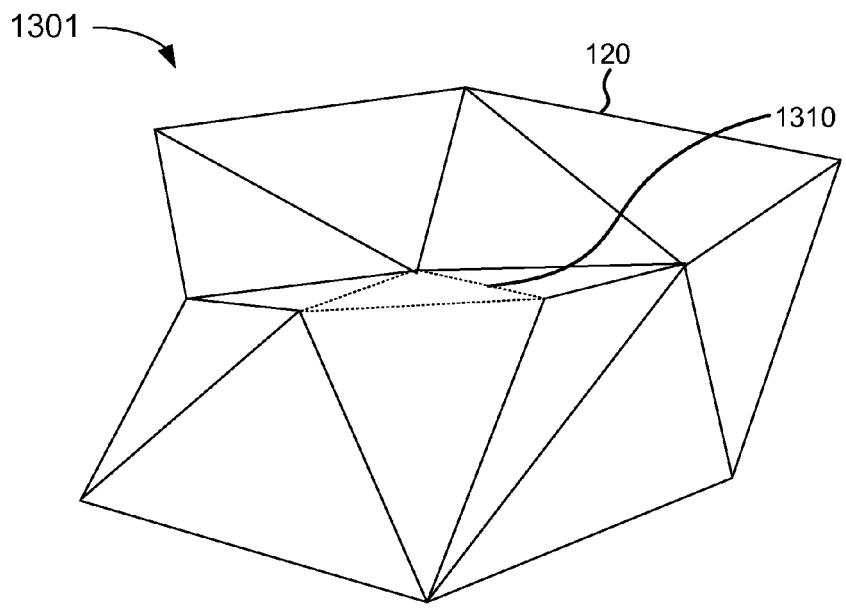
FIG. 13A
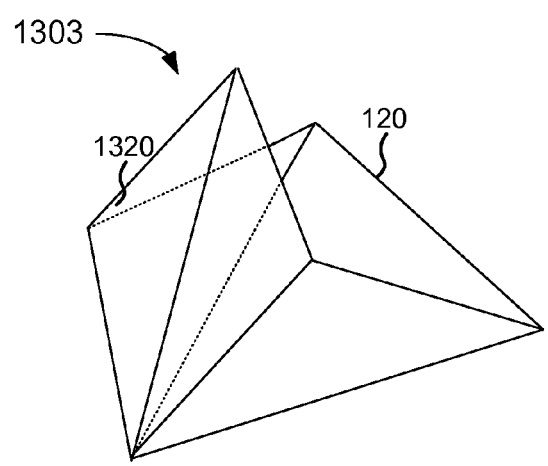
FIG. 13B  FIG. 13C

3D SCANNING WITH DEPTH CAMERAS USING MESH SCULPTING

BACKGROUND INFORMATION

Electronic devices, such as mobile communication devices, may include different types of cameras to enable a user to capture images or video. One type of camera that may be included on a mobile communication device is a depth camera. A depth camera may capture images that include depth information. The depth information may be used, for example, to change the focus of an image.

SUMMARY OF THE INVENTION

According to one aspect, a method, performed by a computing device, may include capturing, by the computing device, one or more images from a depth camera, wherein the one or more images include depth information; generating, by the computer device, an initial sculpture for an entity in the captured one or more images; performing, by the computer device, a ray casting process on the generated initial sculpture using the depth information; and deforming, by the computer device, the initial sculpture based on the ray casting process to generate a sculpture for the entity.

Additionally, the performing the ray casting process and deforming the initial sculpture may be performed using particular ones of the one or more images.

Additionally, the initial sculpture may include a mesh polygon with vertices and triangular faces, and performing the ray casting process on the generated initial sculpture using the depth information may include casting a ray from an origin point to a particular data point included in the depth information; determining an intersection point of the cast ray with a particular triangular face of the mesh polygon; calculating a force vector to move the intersection point to the particular data point; and determining a vertex force vector for a vertex of the particular triangular face based on the calculated force vector.

Additionally, deforming the initial sculpture based on the ray casting process to generate a sculpture for the entity may include adding up vertex force vectors for a particular vertex of the mesh polygon; and deforming the initial sculpture by moving the particular vertex based on the added up force vectors.

Additionally, the captured one or more images may include color information, and the method may further include determining color information for the particular triangular face based on the color information.

Additionally, determining the color information for the particular triangular face based on the color information may include generating a three dimensional UV map based on the color information; and mapping the generated three dimensional UV map onto the sculpture for the entity.

Additionally, the method may further include determining whether the calculated force vector has a magnitude less than a force magnitude threshold; and ignoring the calculated force vector in determining the vertex force vector when the calculated force vector has a magnitude less than a force magnitude threshold.

Additionally, the method may further include determining an angle between the calculated force vector and the particular triangular face; determining whether the angle is less than an angle threshold; and ignoring the calculated force vector in determining the vertex force vector, when the angle is less than the angle threshold.

Additionally, the method may further include assigning a stability value to the vertex, wherein the stability value is based on a measure of how much the vertex has been deformed; and scaling the vertex force vector based on the assigned stability value.

Additionally, the method may further include determining that an edge associated with the vertex is shorter than an edge length threshold; and adding an edge force, parallel to the edge, to the vertex force vector, in response to determining that the edge associated with the vertex is shorter than the edge length threshold.

Additionally, the method may further include eliminating a component of the vertex force vector that is not parallel to the cast ray.

Additionally, the method may further include determining that the vertex is associated with at least two edges that form an angle that is smaller than an angle threshold; and smoothing out the vertex by applying a force toward a midpoint between distant ends of the at least two edges with respect to the vertex.

Additionally, deforming the initial sculpture based on the ray casting process to generate a sculpture for the entity may include calculating a tension value for the vertex, wherein the tension value is based on a ratio of a magnitude of a sum of forces applied at the vertex to a sum of magnitudes of the forces applied at the vertex; determining whether the tension value is higher than a tension threshold; and tessellating the particular triangular face into two smaller triangular faces, when the tension value is higher than the tension threshold.

Additionally, deforming the initial sculpture based on the ray casting process to generate a sculpture for the entity may include determining that the particular triangular face is associated with an edge that is longer than an edge length threshold; and tessellating the particular triangular face into two smaller triangular faces, when the edge is longer than the edge length threshold.

Additionally, deforming the initial sculpture based on the ray casting process to generate a sculpture for the entity may include determining that an edge associated with the particular triangular face is shorter than an edge length threshold; and removing the edge from the mesh polygon, in response to determining that the edge is shorter than the edge length threshold.

Additionally, performing the ray casting process on the generated initial sculpture using the depth information may include using a graphics processing unit to perform the ray casting process.

According to yet another aspect, a mobile communication device may include logic configured to capture one or more images from a depth camera, wherein the one or more images include depth information; generate an initial sculpture for an entity in the captured one or more images; perform a ray casting process on the generated initial sculpture using the depth information; and deform the initial sculpture based on the ray casting process to generate a sculpture for the entity.

Additionally, the initial sculpture may include a mesh polygon with vertices and triangular faces, and, when performing the ray casting process on the generated initial sculpture using the depth information, the logic may be further configured to cast a ray from an origin point to a particular data point included in the depth information; determine an intersection point of the cast ray with a particular triangular face of the mesh polygon; calculate a force vector to move the intersection point to the particular data point; and determine a vertex force vector for a vertex of the particular triangular face based on the calculated force vector.

Additionally, when deforming the initial sculpture based on the ray casting process to generate a sculpture for the entity, the logic may be further configured to add up vertex force vectors for a particular vertex of the mesh polygon; and deform the initial sculpture by moving the particular vertex based on the added up force vectors.

According to yet another aspect, a non-transitory computer-readable memory device, storing instructions executable by a processor, may include one or more instructions to capture one or more images from a depth camera, wherein the one or more images include depth information; one or more instructions to generate an initial sculpture for an entity in the captured one or more images, wherein the initial sculpture includes a mesh polygon with vertices and triangular faces; one or more instructions to cast a ray from an origin point to a particular data point included in the depth information; one or more instructions to determine an intersection point of the cast ray with a particular triangular face of the mesh polygon; one or more instructions to calculate a force vector to move the intersection point to the particular data point; one or more instructions to determine a vertex force vector for a vertex of the particular triangular face based on the calculated force vector; and one or more instructions to deform the initial sculpture by moving the vertex based on the added up force vectors.

BRIEF DESCRIPTION OF THE DRAWINGS

FIGS. 2A and 2B are diagrams illustrating an exemplary mobile communication device according to an implementation described herein;

FIGS. 13A-13C are diagrams illustrating additional exemplary techniques of deforming a sculpture according to an implementation described herein.

DETAILED DESCRIPTION OF PREFERRED EMBODIMENTS

The following detailed description refers to the accompanying drawings. The same reference numbers in different drawings identify the same or similar elements.

A depth camera may capture images with depth information. For example, the pixels of captured images may include color information (e.g., RGB information) and depth information (e.g., a distance from the camera sensor). The depth information may be used to generate a three-dimensional (3D) model of an entity in the captured images, such as an object, a person's head, a structure, and/or another type of entity. Multiple images of the entity may be captured from multiple angles in order to obtain the necessary information to generate a 3D model.

One method for generating a 3D model is to use a point cloud. A point cloud is a set of 3D points with extra attributes, such as color information. A point cloud may be generated by traversing an image. For each pixel, the 3D coordinates for a point are estimated from the two dimensional XY coordinates of the pixel and the depth information for the pixel. The point clouds generated from each image, from a set of images obtained for an entity, may then be aligned using a method such as an Iterative Closest Point (ICP) method. The ICP method may be used to estimate the rotation and translation needed to align a point cloud from a first image with a point cloud of a second image. However, generating a 3D model using an ICP method may not be satisfactory. For example, the depth information may be associated with a high level of noise and the alignment of the point clouds may result in too many errors.

Implementations described herein relate to 3D scanning with depth cameras using mesh sculpting. A computer device with a depth camera, such as a mobile communication device, may be used to capture one or more images of an entity, such as an object or a person's head, for which a 3D model is to be generated. For example, a user may select an entity in an image displayed on a device and may request the device to generate a 3D model of the entity. The device may then generate an initial sculpture for the entity. The initial sculpture may be a mesh polygon built from triangles. For example, the initial sculpture may be a icosahedron or another type of polygon resembling a sphere. The initial sculpture may correspond to an estimated size and position for the selected entity. A ray casting process may be performed on the initial sculpture and the initial sculpture may be deformed into a sculpture corresponding to the 3D model of the selected entity.

Figure 1A:
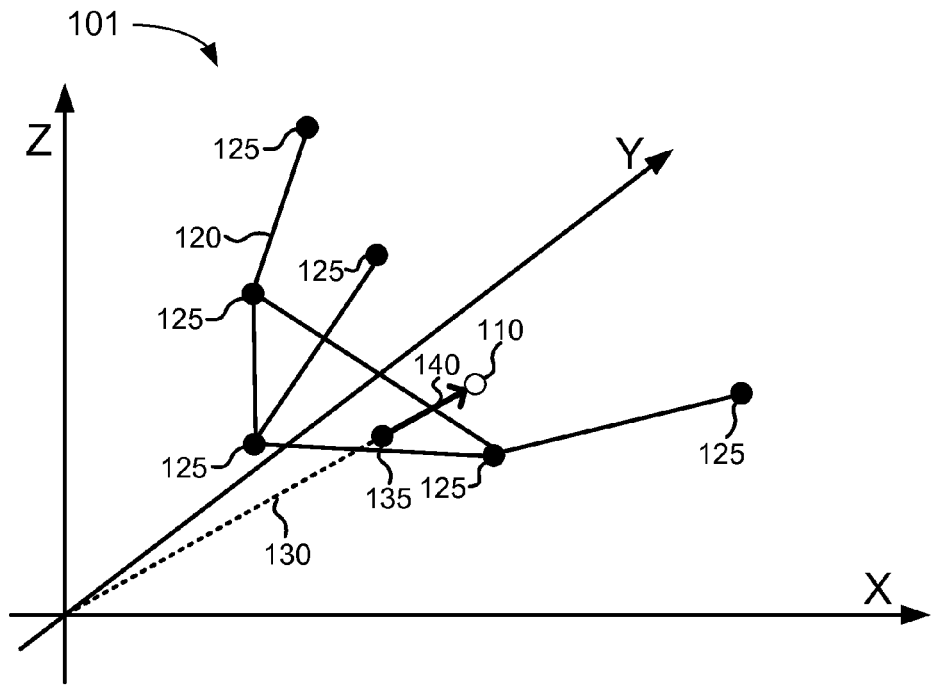
FIGS. 1A and 1B are diagrams illustrating an overview of a ray casting process and deformation according to an implementation described herein.
Figure 1B:
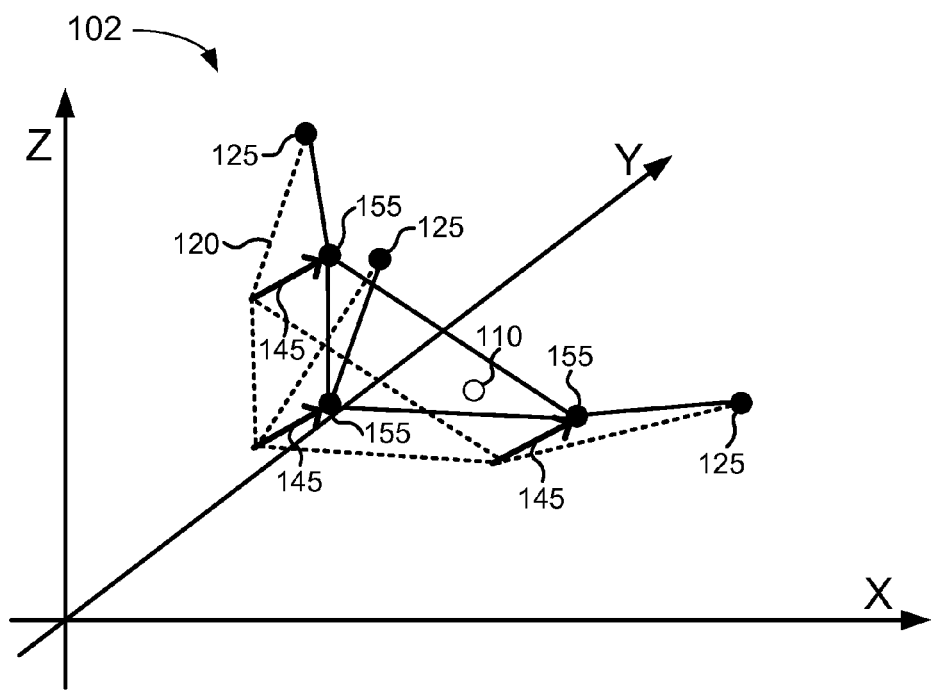

FIGS. 1A and 1B are diagrams illustrating an overview of a ray casting process and deformation process according to an implementation described herein. As shown in FIG. 1A, a ray casting scenario 101 may include a data point 110 and an initial sculpture 120. Data point 110 may correspond to a data point of a captured image that includes depth information. For example, the XY coordinates of data point 110 may be based on the XY coordinates of the pixel in the captured image and the Z coordinate may be based on the depth distance for the pixel. Sculpture 120 may correspond to a mesh polygon with triangular faces defined by vertices 125. Each triangular face may be defined by three vertices 125 and each vertex 125 may be defined by a set of XYZ coordinates. Sculpture 120 may be initially generated as a mesh polygon that resembles a sphere, such as an icosahedron with 20 triangular faces. Initially, sculpture 120 may be positioned and sized based on the estimated size and position of an entity in the captured image for which a 3D model is to be generated.

The ray casting process may be performed as follows. For a particular data point 110, a ray 130 may be cast from the point of origin to data point 110 and the intersection point 135 of the ray with sculpture 120 (i.e., a point at which the ray meets one of the surfaces of sculpture 12) may be calculated. The point of origin may be defined, for example, as the position of the camera sensors that captured the image. A force vector 140 may be computed based on the distance from intersection point 135 to data point 110. The ray casting process may be performed for each data point 110 in the image.

Continuing with FIG. 1B, a deformation scenario 102 may include computing vertex forces 145 for each vertex of sculpture 120. Vertex force 145 for a particular vertex 125 may be based on force vectors 140 determined for a triangular face associated with the particular vertex 125. For example, force 140 from FIG. 1A may determine vertex forces 145 on vertices 125 which make up the face that includes intersection point 135. Vertex forces 145 may be used to deform sculpture 120 by moving vertices 125 to deformed vertices 155, as shown in FIG. 1B.

For explanatory purposes, only one cast ray 130 and one force vector 140 are shown in FIG. 1A and only vertex forces 145 resulting from force vector 140 are shown in FIG. 1B. In practice, vertices 125 may be subject to multiple vertex forces. Vertex 125 may be associated with multiple faces. For example, in an icosahedron, each vertex is associated with five faces. Each face may include multiple intersection points 135 as data points 110 for the image are processed by casting ray 130 to each data point 110. Force vectors 140 for a particular face of sculpture 120 may be added and used to determine vertex forces 145 for vertices 125 of the particular face. The forces for the faces of a particular vertex 125 may be added to determine vertex forces 1445 for the particular vertex 125.

While force 140 in FIG. 1A is shown as a pushing force and vertex forces 145 are shown as pushing vertices 125 in the direction towards data point 110, if a data point appear in front of a face, the resulting force may be a pulling force. Thus, vertices 125 may be either pushed or pulled based on a sum of the forces experienced by each vertex 125. After the data points from a particular image are processed by casting rays, determining intersection points, determining force vectors, determining vertex forces, and deforming the vertices based on the determined vertex forces, the process may be repeated for a next image. In order to generate a 3D model for an entity, images from multiple angles may need to be captured. Each image may include data points that result in a deformation of a particular section of sculpture 120. Thus, a series of images taken from different angles may be used in sequence to deform a section of sculpture 120 to generate a 3D model of the selected entity.

Additional techniques may be used to improve the deformation of the sculpture. The additional techniques may include one or more of ignoring forces that have a magnitude less than a force magnitude threshold; ignoring forces that form an angle with a face of the sculpture that is less than an angle threshold; assigning a stability value to a vertex to measure how much the vertex has been deformed and scaling a vertex force based on the assigned stability value; adding an edge force to a vertex force vector of a vertex when an edge associated with the vertex is shorter than an edge length threshold; eliminating a component of a vertex force vector that is not parallel to a cast ray; smoothing out a vertex by applying a force toward a midpoint between distant ends of edges associated with the vertex when the edges form an angle that is smaller than an angle threshold; tessellating a triangle of the sculpture into two smaller triangles when a tension value for a vertex is higher than a tension threshold; tessellating a triangle of the sculpture into two smaller triangles when an edge of the triangle is longer than an edge length threshold; removing an edge from the mesh polygon when the edge is shorter than an edge length threshold; and/or another technique. Furthermore, color information from the images may be applied to the sculpture. For example, the color information may be used to generate a UV map and the UV map may be mapped onto the deformed sculpture.

Implementations described herein may be implemented in a mobile device. FIGS. 2A and 2B are diagrams of an exemplary mobile device 200 according to an implementation. FIG. 2A illustrates a front view of mobile device 200 and FIG. 2B illustrates a back view of mobile device 200. While FIGS. 2A and 2B depict mobile device 200 as a smart phone, in other implementations, mobile device 200 may include a different type of a portable communication device (e.g., a mobile phone, a phablet device, a wearable computer device (e.g., a glasses smartphone device, a wristwatch smartphone device, etc.), global positioning system (GPS) device, and/or another type of wireless device); a laptop, tablet, or another type of portable computer; a media playing device; a portable gaming system; and/or any other type of computer device with a depth camera. Furthermore, implementations described herein may be implemented in a computer device that does not include a mobile device, such as a desktop computer, a server device, and/or another type of computer device. As shown in FIGS. 2A and 2B, mobile device 200 may include a housing 210, a touchscreen 220, a microphone 230, a speaker 240, and a depth camera 250.

Housing 210 may enclose mobile device 200 and may protect the components of mobile device 200 from the outside elements (e.g., moisture, dirt, etc.). Touchscreen 220 may include a display device and an input device configured to detect a user's touch. While FIG. 2A illustrates mobile device 200 with a touchscreen, in other implementations, mobile device 200 may not necessarily include a touchscreen. For example, mobile device 200 may include a display and a keyboard and/or keypad. Touchscreen 220 may include a liquid crystal display (LCD), an electronic ink display (e.g., an electrophoretic display), an electroluminescent display, and/or another type of display. Furthermore, touchscreen 220 may include touch sensors, such as capacitive sensors (e.g., surface capacitive sensors, projected capacitive touch sensors, etc.), resistive sensors (e.g., analog resistive sensors, digital resistive sensors, etc.), optical sensors (e.g., optical imaging sensors, rear diffused illumination sensors, infrared grid sensors, diffused surface illumination sensors, etc.), acoustic wave sensors (e.g., surface acoustic wave sensors, bending wave sensors, etc.), and/or another type of touch sensors. Furthermore, touchscreen 220 may include sensors to sense an amount of force being applied to touchscreen 220, such as piezoresistive sensors.

Microphone 230 may receive audio signals and convert the received audio signals to electrical signals for mobile device 200. Speaker 240 may receive electrical signals from within mobile device 200 and generate audio signals based on the received electrical signals.

Mobile device 200 may include additional sensors (not shown in FIGS. 2A and 2B). For example, mobile device 200 may include one or more tilt sensors, such as accelerometers and/or gyroscopes, configured to sense a tilt, position, and/or orientation of mobile device 200 in space; one or more Global Positioning System (GPS) receivers; one or more magnetic field sensors (e.g., to sense the magnetic North); motion detection sensors to sense motion in the vicinity of mobile device 200; and/or other types of sensors.

Depth camera 250 may include an array of visible light cameras, infrared light cameras, ultraviolet light cameras, and/or another type of cameras. As an example, depth camera 250 may include a 4×4 array of 16 cameras. The array of cameras may be used to obtain depth information for an image through, for example, parallax detection and/or super-resolution techniques.

Although FIGS. 2A and 2B show exemplary components of mobile device 200, in other implementations, mobile device 200 may include fewer components, different components, differently arranged components, or additional components than those depicted in FIGS. 2A and 2B. Additionally or alternatively, one or more components of mobile device 200 may perform functions described as being performed by one or more other components of mobile device 200.

Figure 3:
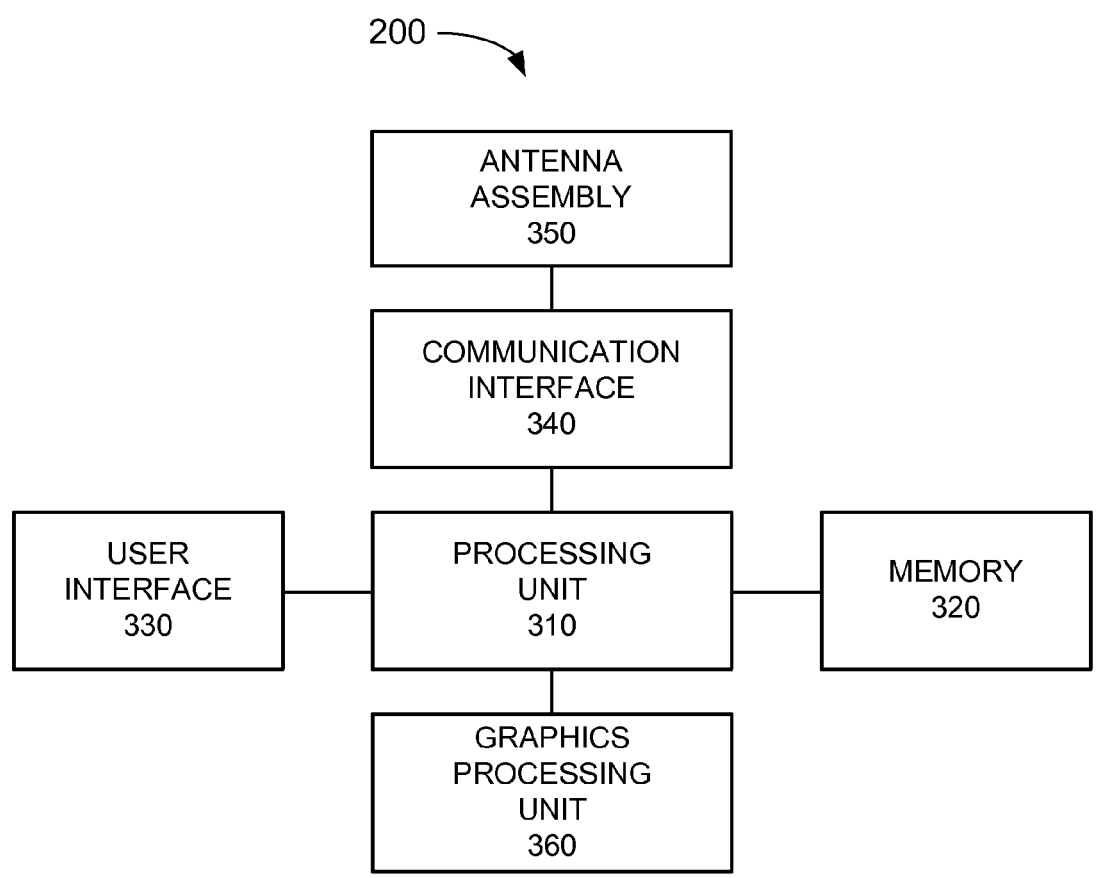
FIG. 3 is a diagram illustrating exemplary components of the mobile communication device of FIG. 2.

FIG. 3 is a diagram illustrating exemplary components of mobile device 200 according to an implementation described herein. As shown in FIG. 3, mobile device 200 may include a processing unit 310, a memory 320, a user interface 330, a communication interface 340, an antenna assembly 350, and a graphics processing unit (GPU) 360.

Processing unit 310 may include one or more processors, microprocessors, application specific integrated circuits (ASICs), field programmable gate arrays (FPGAs), and/or other processing logic. Processing unit 310 may control operation of mobile device 200 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to mobile device 200 and/or to output information from mobile device 200. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 300 to vibrate; a sensor; and/or any other type of input or output device.

Communication interface 340 may include a transceiver that enables mobile device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

GPU 360 may include one or more devices that include specialized circuits for performing operations relating to graphics processing (e.g., block image transfer operations, simultaneous per-pixel operations, etc.) and/or for performing a large number of operations in parallel. GPU 360 may be used by processing unit 310 to speed up the ray casting process and or the sculpture deformation process according to one or more implementations described herein.

As described herein, mobile device 200 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of mobile device 200, in other implementations, mobile device 200 may include fewer components, different components, differently arranged components, or additional components than those depicted in FIG. 3. Additionally or alternatively, one or more components of mobile device 200 may perform the tasks described as being performed by one or more other components of mobile device 200.

Figure 4:
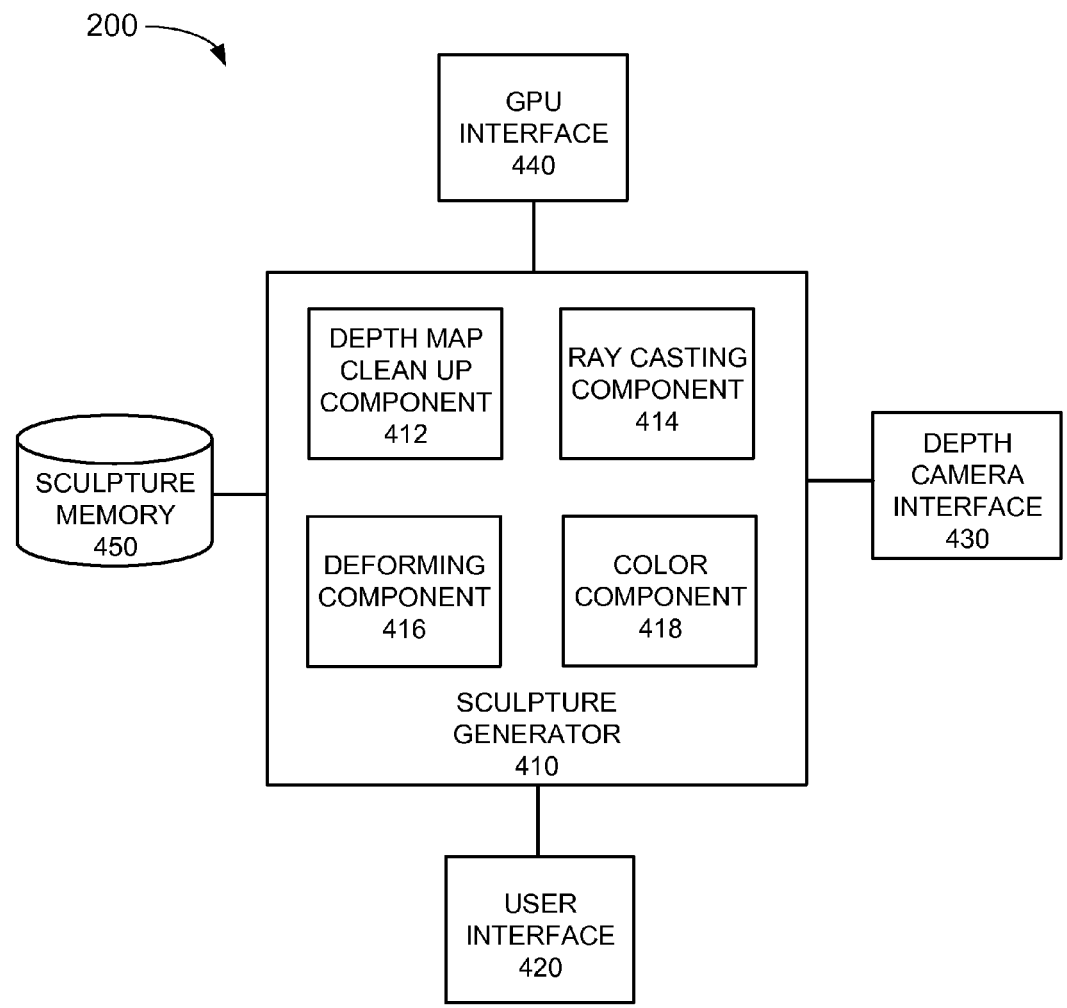
FIG. 4 is a diagram illustrating exemplary functional components of the mobile communication device of FIG. 2.

FIG. 4 is a diagram illustrating exemplary functional components of mobile device 200 according to an implementation described herein. The functional components of mobile device 200 may be implemented, for example, via processing unit 310 executing instructions from memory 320. Alternatively, some or all of the functional components of mobile device 200 may be implemented via hard-wired circuitry.

As shown in FIG. 4, mobile device 200 may include a sculpture generator 410, a user interface 420, a depth camera interface 430, a GPU interface 440, and a sculpture memory 450. Sculpture generator 410 may correspond to an application installed on mobile device 200 and configured to generate a 3D sculpture based on images obtained from depth camera 250. Sculpture generator 410 may include a depth map clean up component 412, a ray casting component 414, a deforming component 416, and a color component 418.

Depth map clean up component 412 may clean up a depth map for an image captured by depth camera 250 by processing the depth map using one or more filters. For example, depth map clean up component 412 may apply a Gaussian smoothing filter, a bilateral filter, a deblocking filter, and/or another type of filter to clean up a depth map.

Ray casting component 414 may perform a ray casting process on data points in an image with depth information using a generated sculpture. For example, ray casting component 414 may generate an initial sculpture, may cast a ray to each data point in an image for which depth information is available, and may determine an intersection point of the cast ray and a face of the initial sculpture. Ray casting component 414 may then determine a force to move the intersection point to the data point. Ray casting component 414 may perform additional operations during the ray casting process, such as determining whether a particular force vector should be ignored, scaled, or otherwise modified based on additional processing criteria. Ray casting component 414 may repeat the ray casting process for each frame (e.g., image) in a set of captured images associated with the entity.

Deforming component 416 may determine vertex forces for vertices of the sculpture based on the force vectors determined during the ray casting process. Deforming component 416 may sum the forces for each vertex and may move the vertex based on calculated sum of vertex forces. Deforming component 416 may perform additional operations based on one or more criteria associated with the deformation process, such as tessellating a triangle if a vertex of the triangle experiences tension higher than a tension threshold and/or if an edge of a triangle is longer than an edge length threshold. Deforming component 414 may repeat the deforming process for each frame in a set of captured images associated with the entity.

Color component 418 may determine color information for a generated sculpture based on color information included in images captured by depth camera 250. For example, color component 418 may generate a UV map using the color information and may map the UV map onto the generated sculpture.

User interface 420 may provide a user interface that may enable a user to interact with sculpture generator 410. As an example, user interface 420 may be configured to guide the user through a process of capturing a series of images by providing instructions on positioning depth camera 250 at different angles with respect to an entity for which a 3D model is to be generated. As another example, user interface 420 may be configured to enable a user to select an entity from an image for which a 3D sculpture is to be generated. For example, via user interface 420, the user may provide a trace around an object in an image. As another example, an object detection process may be performed to identify objects in a captured image and a user may be prompted to select one of the identified objects in the captured image. As yet another example, the user may be prompted to select a target use for a generated sculpture. For example, the user may be prompted to select a particular file format for the sculpture, to select a particular use for the sculpture (e.g., a 3D printer file, a character avatar, etc.). to select a destination to which the generated sculpture should be sent (e.g., a particular web site, user account, etc.), and/or may be prompted to select another type of target use for the generated sculpture.

Depth camera interface 430 may communicate with depth camera 250 to obtain one or more images associated with a sculpture generation process. GPU interface 440 may instruct GPU 360 to perform calculations and/or other types of processing on behalf of sculpture generator 410. For example, sculpture generator 410 may instruct GPU 360 via GPU interface 440 to perform calculations associated with the ray casting process.

Sculpture memory 450 may store data associated with the generation of a 3D sculpture. For example, sculpture memory 450 may store captured images, may store data structures associated with a ray casting process and/or a deformation process, may store a generated 3D sculpture for an entity, and/or may store other information associated with sculpture generator 410.

Although FIG. 4 shows exemplary functional components of mobile device 200, in other implementations, mobile device 200 may include fewer functional components, different functional components, differently arranged functional components, or additional functional components than those depicted in FIG. 4. Additionally or alternatively, one or more functional components of mobile device 200 may perform functions described as being performed by one or more other functional components of mobile device 200.

Figure 5:
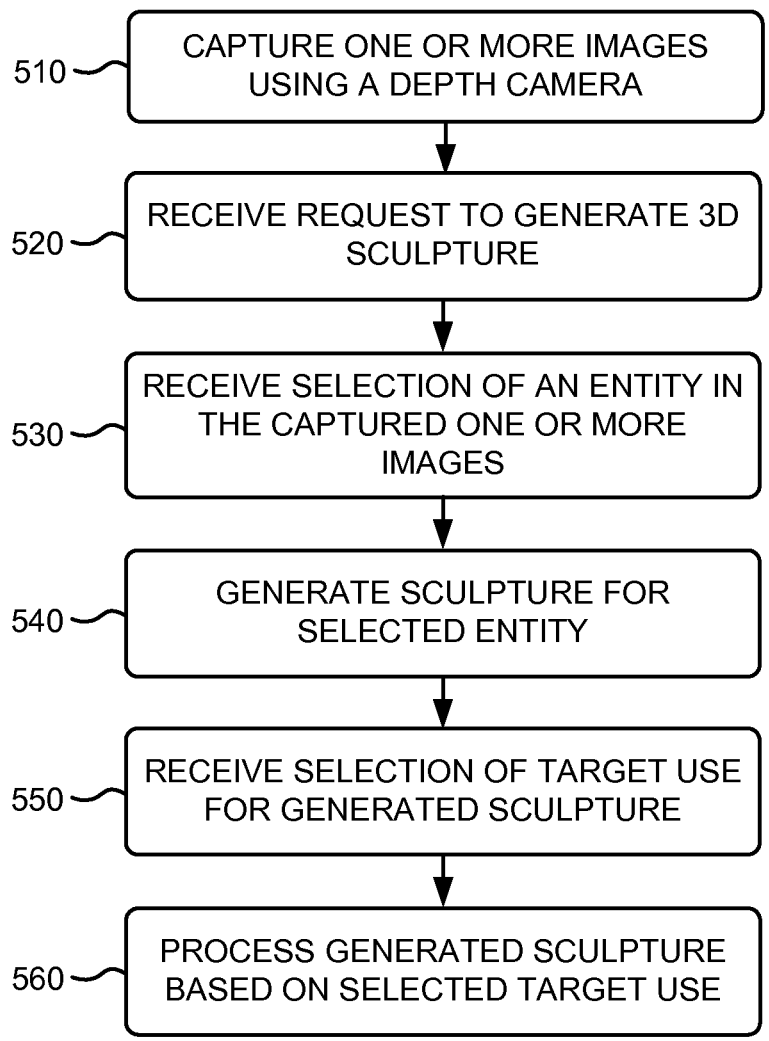
FIG. 5 is a flow chart of an exemplary process for guiding a user through a process of generating a sculpture according to an implementation described herein.

FIG. 5 is a flow chart of an exemplary process for guiding a user through a process of generating a sculpture according to an implementation described herein. In some implementations, the process of FIG. 5 may be performed by mobile device 200. In other implementations, some or all of the process of FIG. 5 may be performed by another device or a group of devices separate from mobile device 200 or including mobile device 200.

The process of FIG. 5 may include capturing one or more images using a depth camera (block 510) and receiving a request to generate a 3D sculpture (block 520). For example, the user may take a series of pictures using depth camera 250, of an object, a person's head, or another type an entity for which the user wants to generate a 3D sculpture. After taking the pictures, the user may activate sculpture generator 410 and may request to generate a 3D sculptures based on the pictures. Alternatively, the user may activate sculpture generator 410, may request to generate a 3D sculpture of an entity displayed via depth camera 250 on touchscreen 220, and may be guided by user interface 420 to take a series of pictures of the entity at various angles to capture depth information about the entity.

A selection of an entity in the captured one or more images may be received (block 530). As an example, the user may select an entity in an image via user interface 420 by defining a region of the image via touchscreen 220 (e.g., by tracing a finger around an object in the image, etc.). As another example, sculpture generator 410 may run an object recognition process on the image (e.g., using an edge detection algorithm) and may identify one or more objects in the image. The user may then select one of the objects via touchscreen 220.

A sculpture may be generated for the selected entity (block 540). For example, sculpture generator 410 may generate an initial sculpture for the selected entity, perform a ray casting process, and deform the initial sculpture to generate a 3D sculpture for the selected entity, as described below with reference to FIG. 6.

A selection of a target use for the generated sculpture may be received (block 550) and the generated sculpture may be processed based on the selected target use (block 560). For example, the user may be provided with one or more options for a target use for the generated 3D sculpture by user interface 420 and may select one of the options. In response, sculpture generator 410 may convert the generated sculpture into a format associated with the selected target use. As an example, the user may select to convert the generated sculpture into a computer-aided design (CAD) file format, into a 3D printer file format, into a character avatar file for a computer game, and/or another type of 3D model file format.

Figure 6:
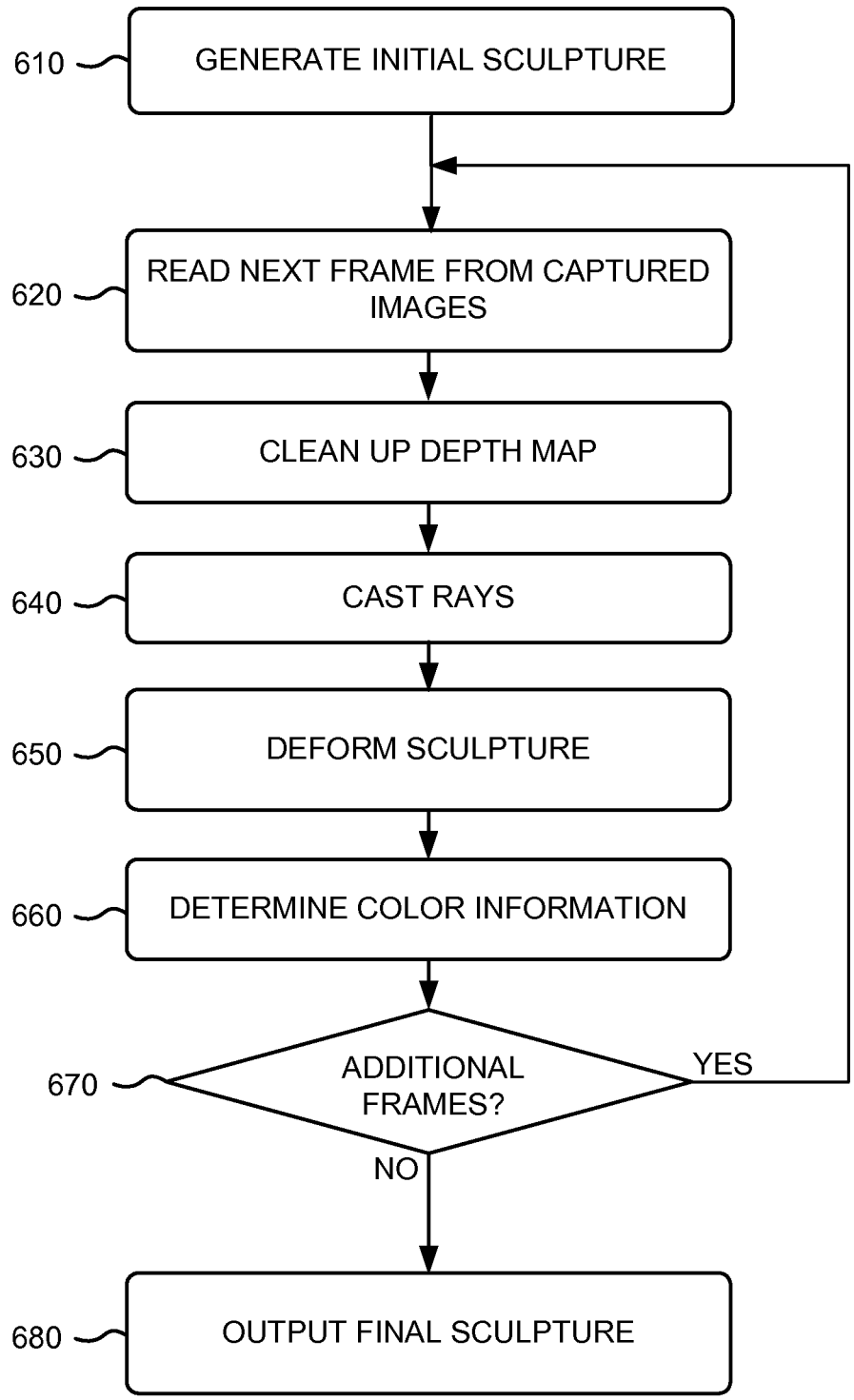
FIG. 6 is a flow chart of an exemplary process for generating a sculpture based on captured images according to an implementation described herein.

FIG. 6 is a flow chart of an exemplary process for generating a sculpture based on captured images according to an implementation described herein. In some implementations, the process of FIG. 6 may be performed by mobile device 200. In other implementations, some or all of the process of FIG. 6 may be performed by another device or a group of devices separate from mobile device 200 or including mobile device 200.

The process of FIG. 6 may include generating an initial sculpture (block 610). For example, sculpture generator 410 may generate a point cloud from the first frame of the captured images. Sculpture generator 410 may then select a size and position based on the size and position of the selected entity for which a sculpture is to be generated. In some implementations, sculpture generator 410 may generate an initial sculpture of a spherical shape, such as an icosahedron with twenty triangle faces. In other implementations, sculpture generator 410 may select a particular shape for the initial sculpture (e.g., spherical, ovoid, flattened, rectangular, etc.) based on an estimated shape of the selected entity. The shape may be estimated by the user by, for example, tracing a shape on touchscreen 220, may be estimated using an object recognition process, and/or may be estimated using another technique.

A next frame may be read from the captured images (block 620) and a depth map may be cleaned up (block 630). For example, sculpture generator 410 may access a captured image received via depth camera interface 430 and stored in sculpture memory 450 and may provide the image to depth map clean up component 412. Depth map clean up component 412 may apply a Gaussian smoothing filter, a bilateral filter, a deblocking filter, and/or another type of filter to the image to clean up a depth map. Rays may be cast (block 640) and the sculpture may be deformed (block 650). A process of ray casting and sculpture deformation is described below in more detail with reference to FIG. 7.

Color information may be determined (block 660). Color information for the sculpture may be determined based on the color information included in the obtained images. For example, each pixel that includes depth information may also include color information, such as RGB values (or values for another type of color scheme) for the pixel. Each triangle in the sculpture may be associated with a UV map in which a texture coordinate is assigned to each vertex. When an intersection point is calculated for a triangle, a texture coordinate matching the intersection point may be calculated. The weights used to calculate the intersection point (as explained below with reference to block 715 of FIG. 7) may be used to determine the texture coordinate matching the ray and the color information, associated with data point 110, may be stored for the determined texture coordinate.

One problem that may need to be overcome with the generation of such a UV map for the sculpture is that the original sculpture resembles a sphere that does not have borders. Since the images captured by depth camera 250 have borders, it may not be possible to map the sculpture onto an image without adding seams. However, adding seams may result in at least two different UV coordinates being associated with a particular vertex, which may complicate computations and may result in an incorrect mapping if wrong seams are selected.

In order to ensure correct mapping, one method may be to always choose the closest vertex for a particular UV point. However, this method may not provide satisfactory result. A better solution may be to use 3D UV coordinates. Thus, instead of associating 2D UV coordinates u and v for each vertex, color component 418 may associate a 3D x', y', and z' coordinate, which are on the surface of a unit sphere. The default values for the x', y', and z' coordinates are calculated from the default 3D coordinates of the initial sculpture. The 2D UV coordinates of the intersection points are determined by calculating the 3D UV coordinates and the performing a spherical un-mapping using the following equations:

$$u = \arctan\left(\frac{z}{x}\right) \cdot \frac{1}{2\pi} + 0.5$$

$$v = \arcsin(y) \cdot \frac{1}{\pi} + 0.5$$

To store the color information, interpolation of the 3D UV coordinates is performed instead of using the 2D coordinates, which avoids the wrapping situation, as the 3D UV coordinates are on the surface of a sphere. After interpolating the 3D UV coordinates, the 2D mapping is performed using the spherical un-mapping formulas shown above.

A determination may be made as to whether there are additional frames (block 670). For example, sculpture generator 410 may access sculpture memory 450 to determine whether additional images have been obtained from depth camera 250 via depth camera interface 430. If it is determined that there are additional frames to be processed (block 670—YES), processing may return to block 620 to read the next frame from the captured images. In some implementations, alignment of image frames with the sculpture may be facilitated using additional sensors associated with mobile device 200. For example, a gyroscope sensor, an accelerometer sensor, and/or a digital compass sensor of mobile device 200 may be used to generate a rotation vector that may be used to determine the position and/or rotation of depth camera 250 during the capture of particular images.

If it is determined that there are no additional images to be processed (block 670—NO), the final sculpture may be outputted (block 680). For example, sculpture generator 410 may save the final sculpture in sculpture memory 450 and may enable the user to manipulate the sculpture on touchscreen 220 and/or to convert the sculpture into a particular format for a particular application.

Figure 7:
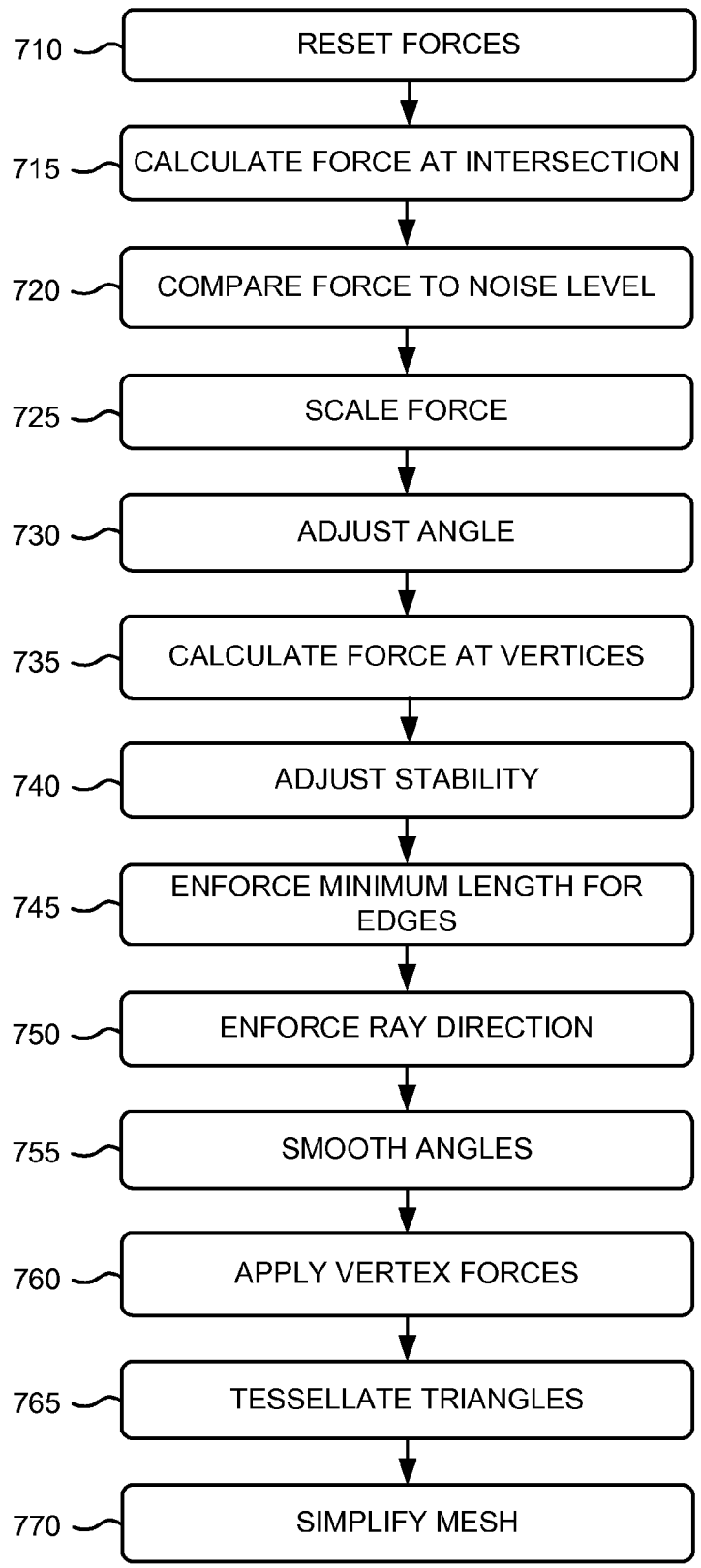
FIG. 7 is a flow chart of an exemplary process for deforming a sculpture according to an implementation described herein.

FIG. 7 is a flow chart of an exemplary process for deforming a sculpture according to an implementation described herein. In some implementations, the process of FIG. 5 may be performed by mobile device 200. In other implementations, some or all of the process of FIG. 77 may be performed by another device or a group of devices separate from mobile device 200 or including mobile device 200.

The process of FIG. 7 may include resetting forces (block 710). During a previous ray casting process, based on a captured image, each vertex of sculpture 120 may have accumulated vertex forces which were used to deform the sculpture. The forces are reset before the next ray casting process is performed.

Force at an intersection is calculated (block 715). As explained above with reference to FIG. 1A, ray 130 is cast from a point of origin, such as the position of depth camera 250 with respect to the depth information included in the captured image, toward data point 110. Intersection point 135 is calculated to determine the point at which the cast ray intersects sculpture 120. Intersection point 135 is calculated based on the coordinates of vertices 125 that form a triangle through which ray 130 intersects sculpture 120 to reach data point 110. If data point 110 is behind sculpture 120, force 140 at intersection point 135 will be a pushing force. If data point 110 is in front of sculpture 120, force 140 at intersection point 135 will be a pulling force.

Additional processing may be performed on the calculated force at the intersection. The additional processing steps may be selected and applied to improve the accuracy of the 3D sculpture being generated and/or to improve processing efficiency. For example, in some situations, the user may be provided with a user interface that enables the user to fine tune the sculpting process by selecting whether to apply particular types of additional processing. Furthermore, the user may be able to select particular parameters for the additional processing steps.

The additional processing may include comparing the force to a noise level (block 720). The computed intersection force may be compared to a force magnitude threshold and a determination may be made as to whether the calculated force at the intersection has a magnitude less than a force magnitude threshold. The calculated force may be ignored (e.g., not applied to determine a vertex force) when the calculated force vector has a magnitude less than a force magnitude threshold.

Figure 8A:
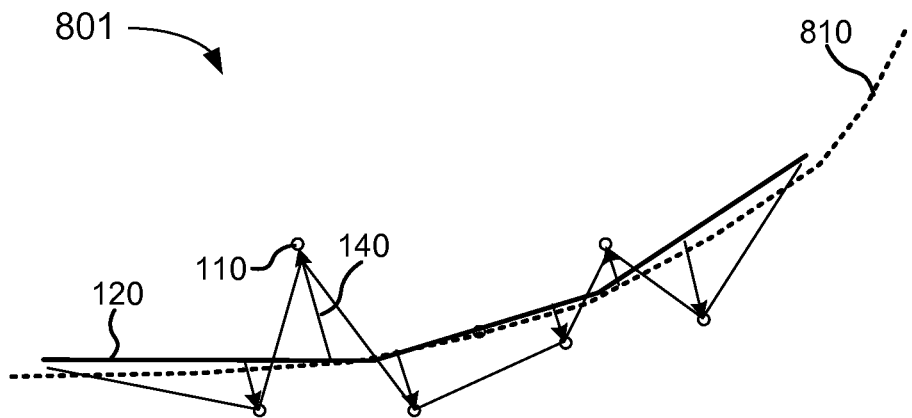
FIGS. 8A and 8B are diagrams illustrating an exemplary technique of deforming a sculpture according to an implementation described herein.
Figure 8B:
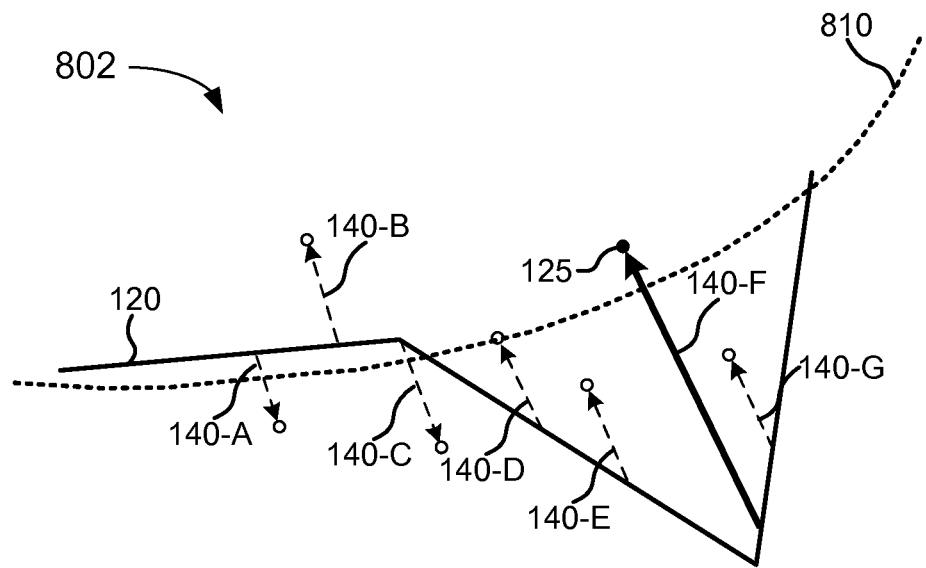

FIG. 8A illustrates a scenario 801 that shows the effect of small forces on sculpture generation. As shown in FIG. 8A, an entity 810 may be approximated by sculpture 120. The depth data captured by depth camera 250 may include noisy data. For example, depth camera 250 may be able to determine 100 distinct depth values with a noise level of ±4. The depth data may result in small forces 140 that, if applied to sculpture 120, may result in high tension between the vertices, which will lead to the sculpture being unnecessarily tessellated (as explained further down) and/or distorted. In order to avoid such problems, forces with small magnitudes may be ignored. FIG. 8B illustrates a scenario 802 in which small forces are ignored. Forces 140-A, 140-B, 140-C, 140-D, 140-E, and 140-G have a magnitude that is less than the force magnitude threshold and thus may be ignored. Only force 140-F may be applied to deform sculpture 120.

Returning to FIG. 7, the force may be scaled (block 725). A global coefficient may be applied to scale down the calculated forces. The global coefficient may be selected to avoid oscillations in which the forces move the vertices past the target in one oscillation (e.g., while a first image frame is being processed) and then move the vertices back in the next oscillation (e.g., while a second image frame is being processed).

Figure 9A:
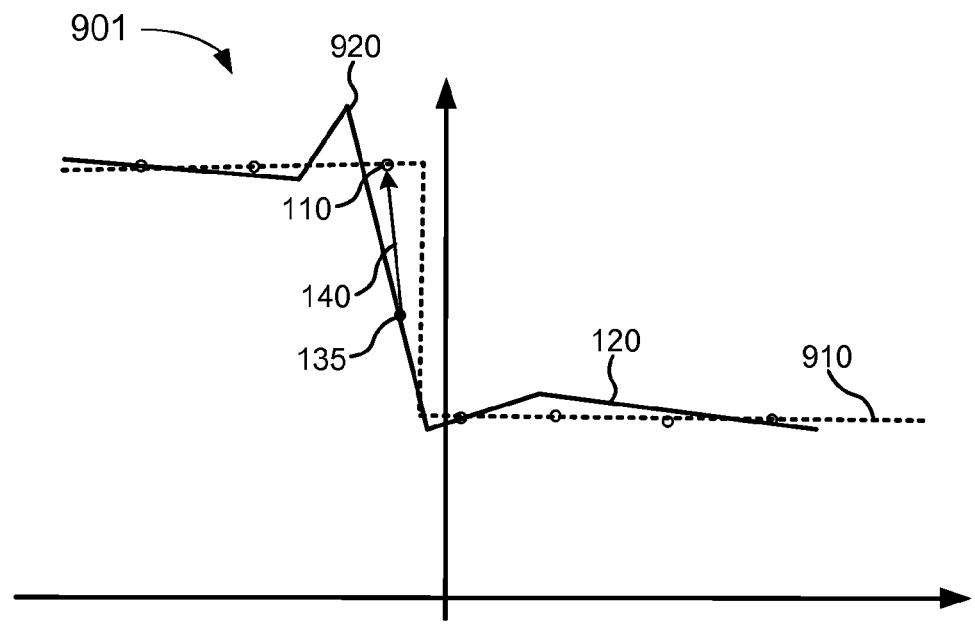
FIGS. 9A and 9B are diagrams illustrating another exemplary technique of deforming a sculpture according to an implementation described herein.
Figure 9B:
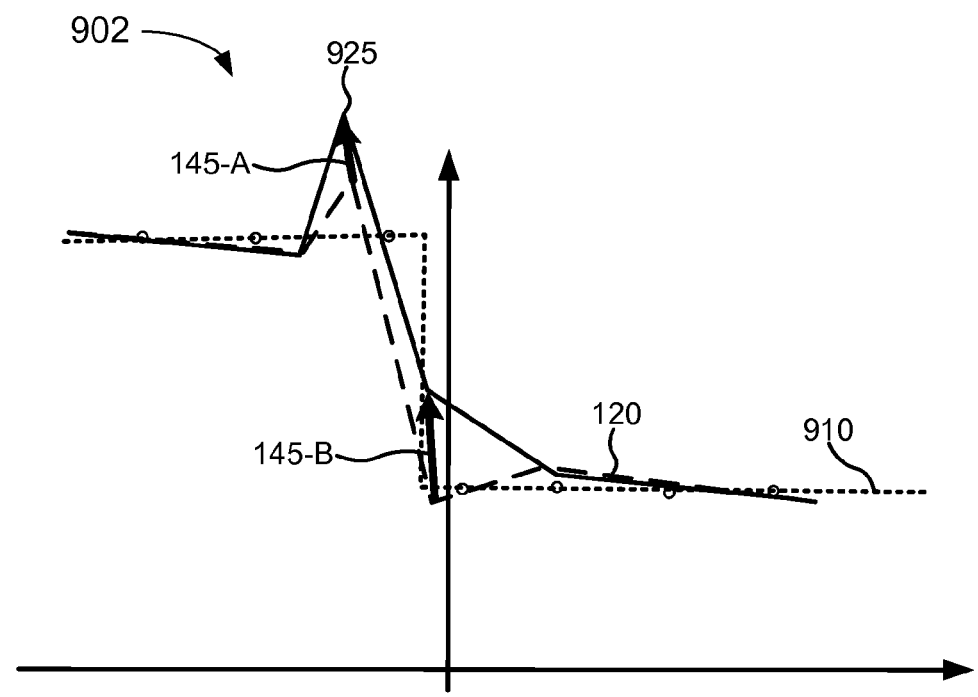

Angles may be adjusted (block 730). For example, sculpture generator 410 may determine an angle between the calculated force vector and the particular triangular face, may determine whether the angle is less than an angle threshold, and may ignore the calculated force vector in determining the vertex force vector, when the angle is less than the angle threshold. FIG. 9A illustrates a scenario 901 that shows the effect of low angles on sculpture generation. As shown in FIG. 9A, an entity 910 may be approximated by sculpture 120. During deformation of sculpture 120, an artifact spike 920 may appear which may not accurately reflect the shape of entity 910. If data point 110 exists close to the spike, and if a force 140 from a ray through intersection point 135 is applied towards data point 110, instead of being smoothed out, spike 920 can be made taller, as shown in scenario 902 of FIG. 9B. Based on force 140, vertex forces 145-A and 145-B are applied to the vertices of the face on which intersection point 135 is found. However, vertex forces 145-A and 145-B will result in a taller spike 925, rather than smoothing out spike 920. This is a result of force 140 being at a small angle with respect to sculpture 120. Thus, to avoid exacerbation of artifact spikes, forces which are at small angles with respect to the sculpture may be ignored when determining the vertex forces.

Returning to FIG. 7, forces at vertices may be calculated (block 735). The force at the vertices of a triangular face is based on the force determined at an intersection point at which a ray directed toward a data point intersects the triangular face. Since the force directions at the vertices will be in the same direction as the force at the intersection point, only the scalar weights to apply at the vertices need be determined. Given vertex $P_A$, and given force $\vec{F}$, the force at vertex $P_A$ may be calculated based on $\vec{F}_A = \vec{F} \cdot w_A$, where $w_A$ corresponds to a scalar weight. The equation to determine $w_A$ may correspond to:

$$w_A = \frac{S_{P_S P_B P_C}}{S_{P_A P_B P_C}}$$

where $S_{ABC}$ corresponds to the surface area of a triangle with vertices ABC, where $P_A$, $P_B$, and $P_C$ are the vertices of the triangle, and where $P_S$ is the intersection point of the ray that generated force $\vec{F}$ with triangle ABC. The weights for the other vertices, $P_B$ and $P_C$, $W_B$ and $W_C$, respectively, may be computed similarly. The surface area $S_{ABC}$ may be computed using:

$$S_{ABC} = \frac{|AB \times AC|}{2}$$

where AB and AC are the vectors corresponding to the edges between vertices $P_A$ and $P_B$, and $P_A$ and $P_C$, respectively. After the individual vertex forces are calculated for each force 140, the vertex forces are added for each vertex using vector addition.

Stability may be adjusted (block 740). During calculation of the vertex forces, a stability value may be computed for each vertex. The stability value may correspond to a measure of how much a vertex has been deformed during processing of previous frames of images and may be computed using the following equation:

$$t = 1 - \frac{|\sum \vec{F}|}{\sum |\vec{F}|}$$

where t corresponds to the tension value, which will be somewhere between 0 and 1. If all the forces on the vertex are pointing in the same direction, the value will be 0 and correspond to low tension, and if all the forces cancel each other out by pointing in different directions, the value will be 1 and correspond to a high tension.

The stability value may be used to keep track of which vertices have already been deformed (and the position of the entity). During the deformation of the sculpture, a particular side of the sculpture will be edited with respect to a particular image. As the entity is rotated (or as depth camera 250 is rotated around the entity) to capture images of the entity from different angles, other parts of the entity will be hidden from view. The parts of the sculpture corresponding to the hidden portions may have already been shaped using a previous image. Thus, vertices corresponding to these areas may have already been deformed and may or may not need to be deformed with respect to data points associated with another image. The stability value may be used for this determination. The stability value is an accumulated value that may be not be reset when a next image frame is loaded (unlike the vertex forces). A higher stability value for a vertex may indicate that the vertex should be moved less. Thus, when vertex forces are applied to a vertex, the vertex forces may be scaled down based on the stability value. As each frame of the images is processed, the stability value for the vertex may be calculated and added to the previous stability value to generate a cumulative value.

Figure 10A:
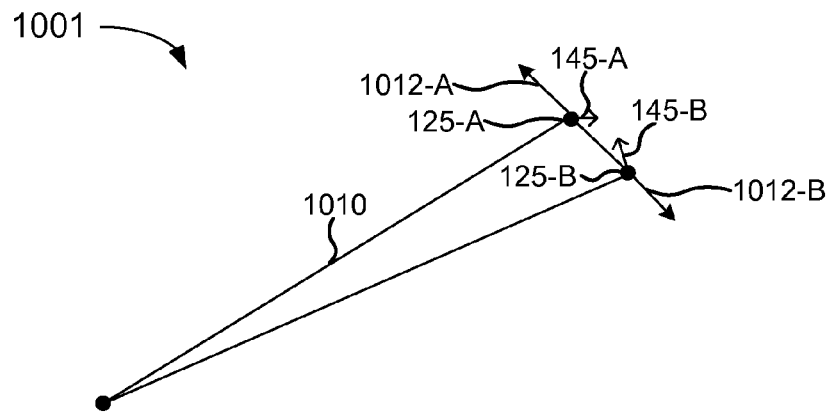
FIGS. 10A-10C are diagrams illustrating additional exemplary techniques of deforming a sculpture according to an implementation described herein.

A minimum length for edges may be enforced (block 745). For example, sculpture generator 410 may determine that an edge associated with the vertex is shorter than an edge length threshold and may add an edge force, parallel to the edge, to the vertex force vector, in response to determining that the edge associated with the vertex is shorter than the edge length threshold. If a sculpture includes too many triangles, the calculations of the forces may be too slow. Thus, a minimum size for a triangle may be set based on a minimum edge length. The minimum edge length may be enforced by adding extra forces on the vertices of the short edge, wherein the extra forces are parallel to the edge direction. This situation is shown in scenario 1001 of FIG. 10A. As shown in FIG. 10A, scenario 1001 includes a triangle 1010 with a short edge defined by vertices 125-A and 125-B. Vertex forces 145-A and 145-B are directed towards each other and may cause vertices 125-A and 125-B to move closer to each other, thereby shortening the edge past an edge length threshold. Thus, extra forces 1012-A and 1012-B may be added to vertices 125-A and 125-B to prevent the edge from becoming too short.

Figure 10B:
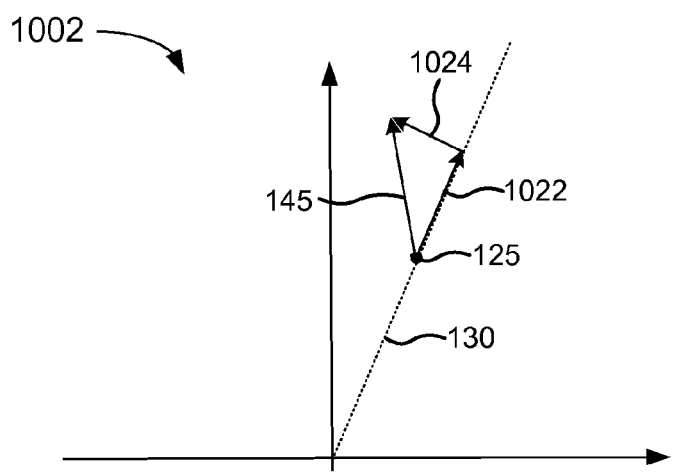

Returning to FIG. 7, ray direction may be enforced (block 750). For example, sculpture generator 410 may eliminate a component of vertex force vector 145 that is not parallel to the cast ray 130. As vertices 125 of sculpture 120 are deformed, and multiple vertex forces 145 are added to a vertex 125, the vertices may end up being moved in multiple directions. For example, vertex forces may cancel each other out along one axis, which may cause the vertex to move along another axis. Thus, while in general the push and pull forces may be towards or away from depth camera 250, the forces may also end up moving vertices in parallel with the image frame, which may be undesirable as it may distort the 3D model. Thus, components of vertex forces 145 that are not parallel to a cast ray may be eliminated. This situation is shown in scenario 1002 of FIG. 10B. As shown in FIG. 10B, scenario 1002 includes vertex 125 associated with vertex force 145. Vertex force 145 may be decomposed into component forces 1022 and 1024, with component force 1022 being parallel to cast ray 130 which gave rise to vertex force 145. Component 1024 may be eliminated and only component force 1022 may be applied to vertex 125.

Figure 10C:
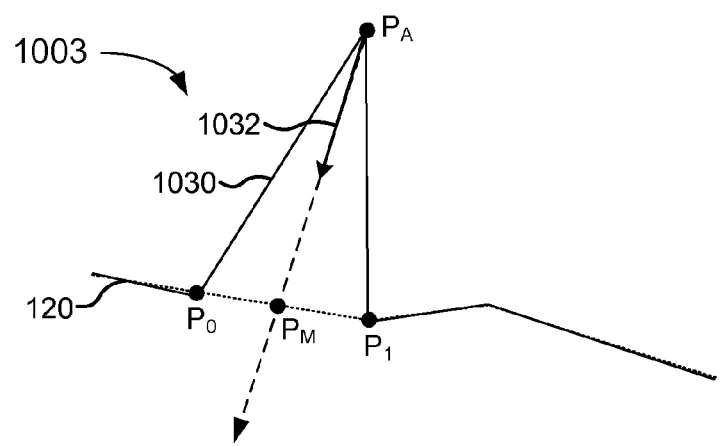

Returning to FIG. 7, angles may be smoothed (block 755). For example, sculpture generator 410 may determine that the vertex is associated with at least two edges that form an angle that is smaller than an angle threshold and may smooth out the vertex by applying a force toward a midpoint between distant ends of the at least two edges with respect to the vertex. Angles of sculpture 120 may be smoothed in order to remove undesirable peaks. This situation is shown in two dimensions in scenario 1003 of FIG. 10C. As shown in FIG. 10C, scenario 1003 may include sculpture 120 with a peak 1030 that has a vertex $P_A$. To reduce peak 1030, the angle $\alpha=P_0P_AP_1$ may be calculated using:

$$\alpha = \arcsin\frac{|P_AP_0 \times P_AP_1|}{|P_AP_0| \cdot |P_AP_1|}.$$

Then, midpoint $P_M$ of $P_0P_1$ may be determined and a force 1032 may be calculated based on vector $P_AP_M$ and scaled with angle $\alpha$ and a global coefficient. The global coefficient may be selected based on how much smoothing is desired and may be, for example, selectable by the user. The computed angle $\alpha$ may be used to scale the applied force (e.g., a flatter peak may require a smaller force) and may be compared to an angle threshold. Without a threshold angle, vertices with no directly applied vertex forces may start moving towards the center of the sculpture, thereby shrinking the hidden parts of the sculpture.

Figure 11A:
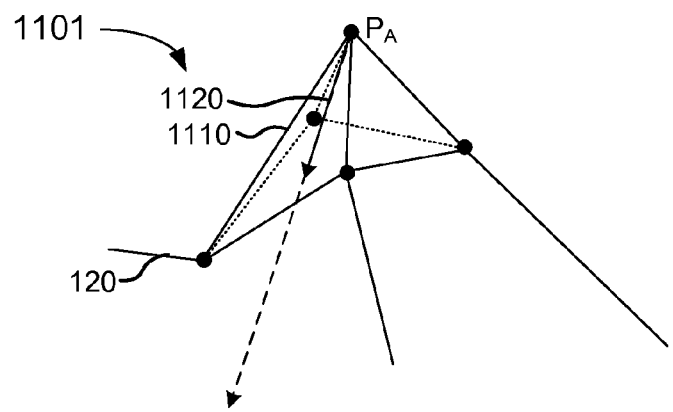
FIGS. 11A-11C are diagrams illustrating additional exemplary techniques of deforming a sculpture according to an implementation described herein.
Figure 11B:
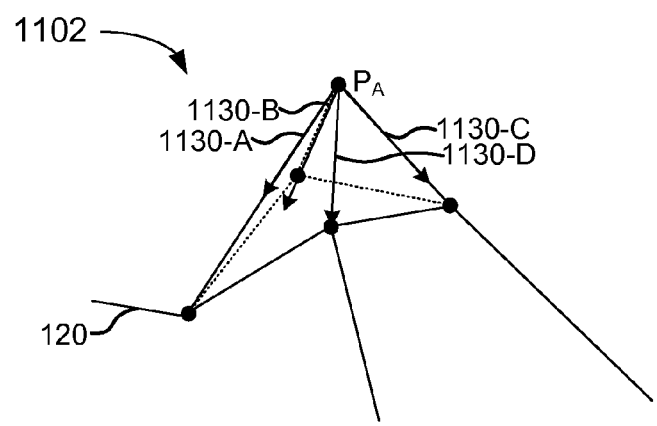

In 3D, a peak may be more complicated, because a vertex can have many neighbors. As shown in FIG. 11A, scenario 1101 includes sculpture 120 with a peak 1110 in which vertex $P_A$ has four neighbors. The center point for the neighbors, through which a smoothing force 1120 may be directed, may be calculated as a sum of normalized edge vectors 1130-A, 1130-B, 1130-C, and 1130-D, which are shown in scenario 1102 of FIG. 11B. The angle $\alpha$ may then be computed using the sum of the normalized vectors as follows:

$$\cos\frac{\alpha}{2} = \frac{\sum_{i=0}^{N-1}\frac{P_AP_i}{|P_AP_i|}}{N}.$$

Two different threshold values may be employed: a first threshold value for vertices being manipulated with respect to the current frame and a second threshold value for inactive vertices that are not manipulated with respect to the current frame. In some implementations, the inactive vertices may not be smoothed. In other implementations, inactive vertices which have been deformed previously are mote smoothed.

Returning to FIG. 7, the vertex forces may be applied (block 760). For example, sculpture generator 410 may add up all the vertex forces for a particular vertex, and may add any additional forces that have been generated for the particular vertex, in order to determine the vertex force that is to be applied to the particular vertex. The sum of all the vertex forces may be divided by the number of forces to determine an average vertex force for the particular vertex, and the result may be divided by a determined stability coefficient for the particular vertex. The particular vertex may then be translated through space based on the total applied vertex force in order to deform the sculpture. This process may be performed for each vertex for which a vertex force was determined with respect to a particular frame from the captured images.

Additional processing may then be performed on the sculpture. Triangles of the sculpture may be tessellated (block 765). For example, sculpture generator 410 may determine whether a tension value for a vertex is higher than a tension threshold and may tessellating the particular triangular face, associated with the vertex, into two smaller triangular faces, when the tension value is higher than the tension threshold. The initial sculpture may be started with a relatively small number of triangular faces (e.g., as an icosahedron with 20 triangles). Some areas of the entity, for which the sculpture is being generated, may require higher detail, which may be represented by a larger number of triangles. One way to detect if higher detail is needed is through the use of the computed tension value for vertices. If the tension value is above a tension threshold, a triangle associated with the vertex may need to be tessellated into smaller triangles in order to capture a higher level of detail.

Figure 11C:
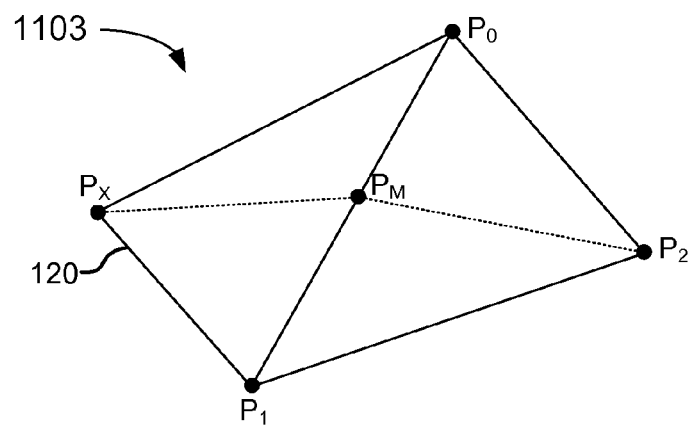

Scenario 1103 in FIG. 11C illustrates a tessellation process. Assume sculpture 120 includes a triangle with vertices $P_0$, $P_1$, and $P_2$. The longest edge may be identified, which may correspond to edge $P_0P_1$, and the midpoint $P_M$ of the longest edge may be identified. Triangle $P_0P_1P_2$ may be replaced with two smaller triangles $P_0P_MP_2$ and $P_MP_1P_2$. The triangle which shared edge $P_1P_0$ with triangle $P_0P_1P_2$ may be identified as triangle $P_0P_XP_1$ and may be replaced with two smaller triangles $P_0P_XP_M$ and $P_1P_XP_M$.

Furthermore, a triangle may be tessellated if the longest edge of the triangle is longer than a particular edge length threshold. For example, sculpture generator 410 may determine that a particular triangular face is associated with an edge that is longer than the particular edge length threshold and may tessellate the particular triangular face into two smaller triangular faces.

Figure 12A:
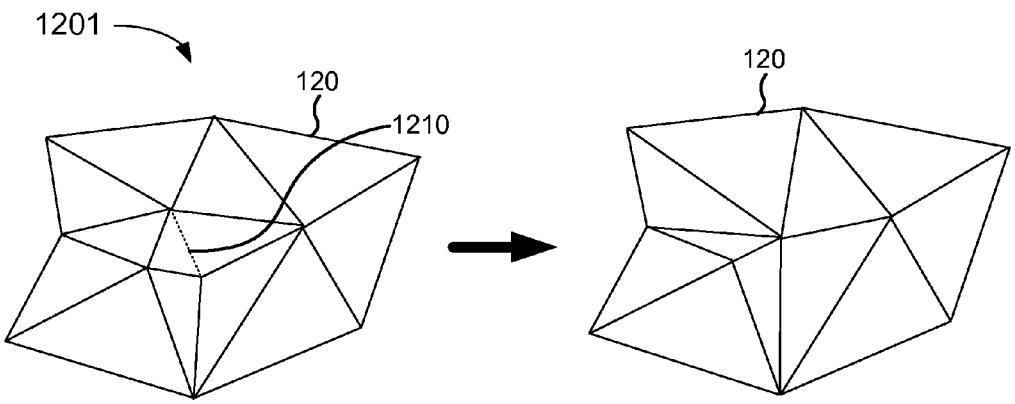
FIGS. 12A-12C are diagrams illustrating additional exemplary techniques of deforming a sculpture according to an implementation described herein.

Returning to FIG. 7, the mesh may be simplified (block 770). For example, sculpture generator 410 may determine that an edge associated with the particular triangular face is shorter than a particular edge length threshold and may remove the edge from the mesh polygon, in response to determining that the edge is shorter than the particular edge length threshold. Tessellation of the triangles of the mesh polygon of sculpture 120 may result in many small triangles that are pushed around, which may result in artifacts such as distorted triangles, a folded section of the mesh polygon, or even a part of the mesh polygon that becomes turned inside out. In order to avoid these problems, techniques may be applied to simplify the mesh of sculpture 120. Small triangles may be eliminated by removing a short edge. This situation is illustrated in scenario 1201 of FIG. 12A, in which edge 1210 is removed from sculpture 120. Edge 1210 may be removed by merging the vertices that make up the endpoints of edge 1210 into one vertex.

Figure 12B:
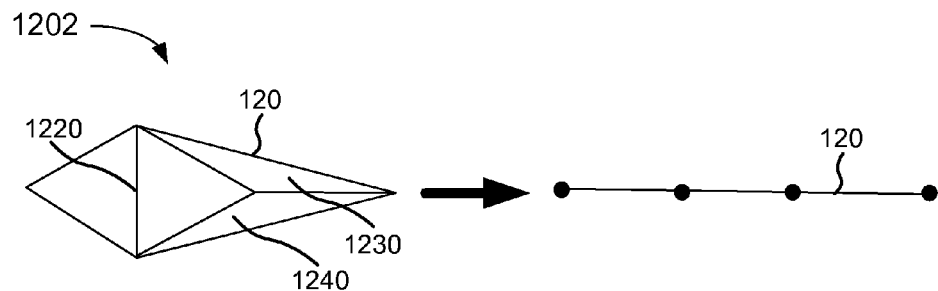

In some situations, edge removal may create a complication. For example, as shown in scenario 1202 of FIG. 12B, removal of edge 1220 may result in the undesirable removal of triangles 1230 and 1240. Thus, before an edge is removed and two vertices are merged, a check needs to be performed to make sure the two vertices have exactly two common neighbor vertices and not more. In some situations, rather than removing an edge, triangles may need to be reconfigured. For example, as shown in scenario 1203 of FIG. 12C, a long edge 1250, which is longer than a particular edge length threshold, may be replaced with a shorter edge 1260.

Figure 12C:
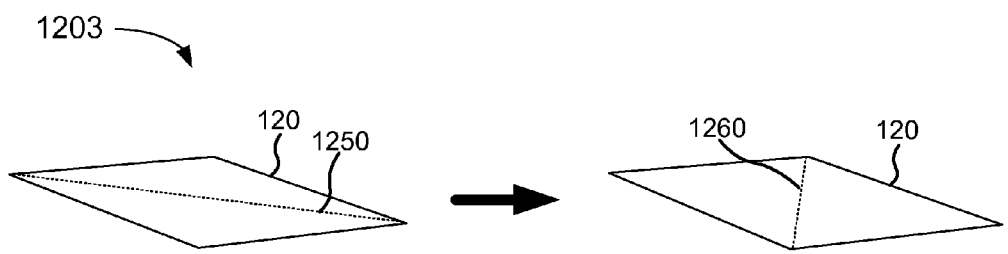

Another technique to simplify the mesh may be to remove small angles between edges. This situation is shown in scenario 1301 of FIG. 13A, in which sculpture 120 includes triangle 1310. Triangle 1310 may have edges which are not shorter than an edge length threshold and thus may not be removed based on a short edge criterion. However, triangle 1310 may have small angles. Thus, for each triangle a determination may be made as to whether the smallest angle of the triangle is smaller than a triangle angle threshold. If the smallest angle of the triangle is below the triangle angle threshold, an edge opposite the smallest angle may be removed from the mesh polygon. Alternatively, the triangle may be reshaped as shown in FIG. 12C.

Furthermore, small 3D angles may be present in the mesh that may not necessarily form an angle of a triangle. This situation is shown in FIGS. 13B and 13C, which demonstrate view 1302 and 1303 of a sculpture 120 that includes a small 3D angle 1320. Small 3D angles may be detected if an angle between two edges is smaller than a 3D angle threshold. The vertices forming the small 3D angle may be merged with one of their neighbor vertices to remove the small 3D angle.

In some implementations, sculpture generator 410 may employ GPU 360 to perform the ray casting process and/or the deformation process. Since the rays are not dependent on each other, the rays can be cast in parallel and thus sculpture generator 410 may make use of the parallel processing available via GPU 360. GPU 360 may perform one or more of determining UV coordinates for the color map, casting of rays, and/or performing vertex post processing (e.g., stability value calculations, angle smoothing, etc.). Since tessellating one triangle may affect another triangle, the tessellation process may need to be performed in sequence and may or may not be performed by GPU 360.

GPU 360 may be employed as follows. Triangles of sculpture 120 may be rendered into a first frame buffer by allocating a unique color to each triangle and disabling shading, anti-aliasing, lighting, and fog to ensure each triangle is rendered with the specified unique color. The vertices of the triangle may be colored with red, green, and blue into a second frame buffer. For each point $P_{XY}$ from a camera image, color values $D_{XY}$ and $T_{XY}$ may be read at the same coordinates from the two frame buffers. The value $D_{XY}$ may identify the triangle being intersected by a ray, since each triangle is assigned a unique color. For example, if GPU 360 supports a 16 bits-per-pixel color depth, GPU 360 may be used to process up to 65,535 triangles. The value $T_{XY}$ may be used to calculate the location of the intersection of the ray with the triangle, using the values in RGB color channels as weights for the triangle's vertex coordinates. Furthermore, the value $T_{XY}$ may also be used to as the weights for calculating the force at the vertices of the triangle. Using this technique with GPU 360 may reduce the complexity of finding an intersecting triangle for a ray from $O(N)$ to $O(1)$, where N corresponds to the number of triangles.

In some implementations, sculpture generator 410 may be configured to interact with the user during the sculpture generation process. For example, the sculpture may be displayed on touchscreen 220 during the sculpture generation process and the user may see how the sculpture is generated from the initial sculpture. Using the computed stability value for each vertex, vertices which are not stable may be colored with a different color, showing to the user which parts of the sculpture need more attention. The user may be guided, or may select without guidance, to capture additional images of the entity from angles associated with vertices which have not achieved sufficient stability.

In some implementations, the user may be able to dynamically adjust the resolution of the sculpture. For example, the user may start with a low resolution and may select to increase the resolution for a particular area of the sculpture if the user desired higher detail. For example, the user may focus closer with depth camera 250 and may capture images that include more detail depth information for a particular area of the entity. As an example, if the user is scanning a person's head, the user may select a lower resolution for the back of the head and a higher resolution for the face. Furthermore, in some implementations, sculpture generator 410 may be configured to enable the user to select how much time to spend processing a particular frame. Thus, the user may select to execute several iterations of the ray casting process for a particular frame.

In some implementations, sculpture generator 410 may be configured to generate a 3D sculpture for entities with holes (e.g., a coffee mug, etc.). In order to generate 3D sculptures for an entity with a hole, two different tension threshold values may be used: $t_t$ and $t_c$. The following rules may then be applied for the average tension t for the vertices of a triangle:
1) if $t<t_1$, apply the calculated forces, but do not tessellate triangle;
2) if $t_t \le t$ and $t<t_c$, tessellate the triangle; and
3) if $t_c \le t$, cut out the triangle to convert the triangle into a hole. Additionally or alternatively, background pixels, associated with a hole in the entity, may be detected and handled differently during the ray casting process. Additionally or alternatively, the sculpture may be analyzed to detect areas where the sculpture intersects itself, and a hole may be created at the area of the intersection.

Figure 14A:
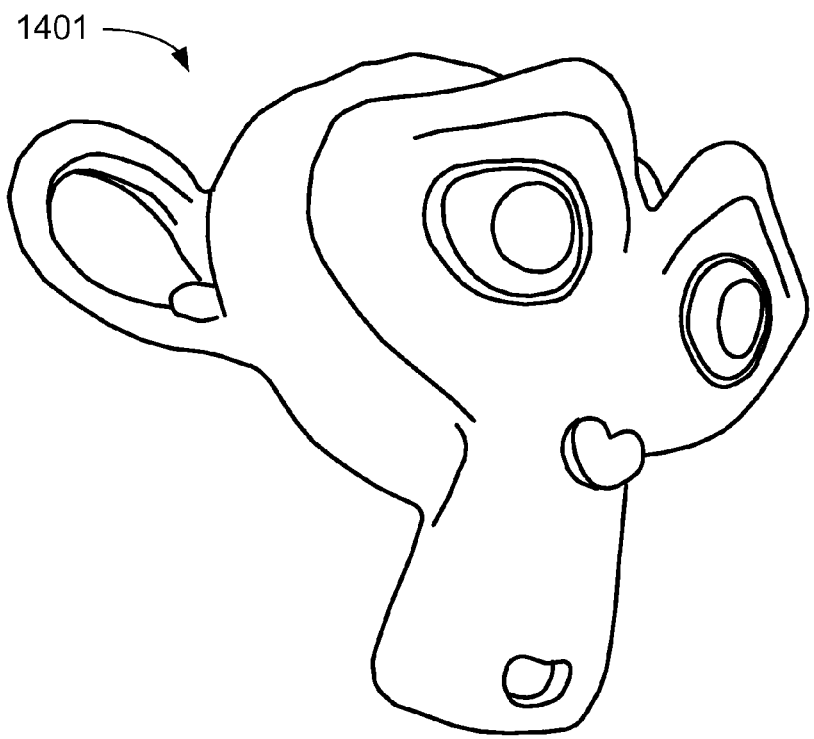
FIGS. 14A and 14B are diagrams of an exemplary object and a corresponding 3D sculpture according to an implementation described herein.
Figure 14B:
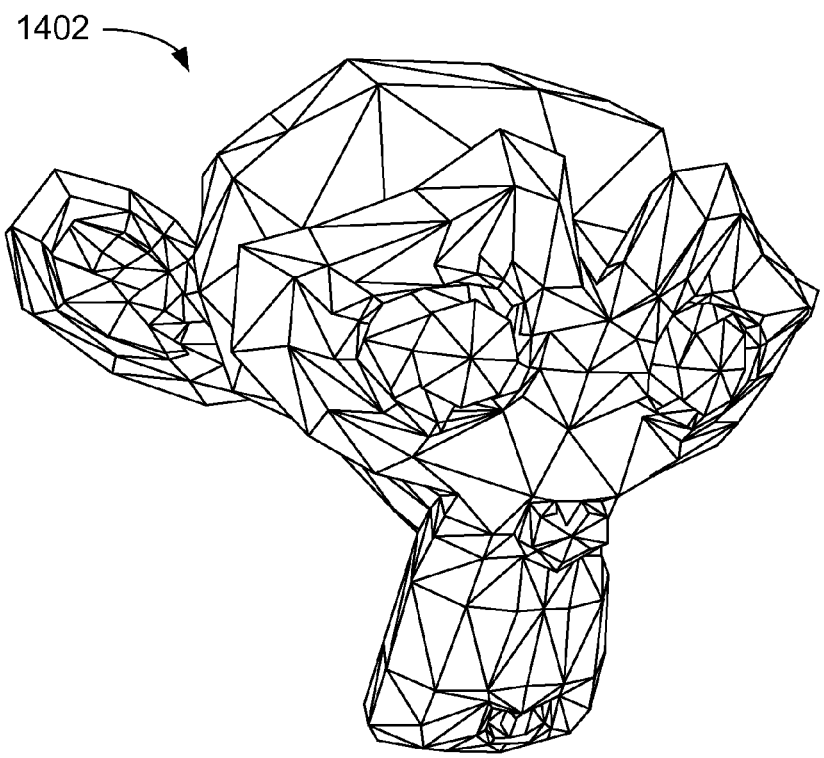

FIGS. 14A and 14B are diagrams of an exemplary object and a corresponding 3D sculpture according to an implementation described herein. As shown in FIG. 14A, an entity 1401 may be photographed using depth camera 250 to capture a series of images from various angles. The captured images may be used, according to the implementations described herein, to generate a 3D sculpture 1402 of the entity. The generated 3D sculpture may correspond to a mesh polygon that has been deformed using a ray casting process based on depth information obtained about entity 1401 using depth camera 250.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5-7, the order of the blocks may be modified in other implementations. Further, non-dependent blocks may be performed in parallel.

As another example, while implementations described herein have been described with respect to images obtained using a depth camera, other types of cameras may be used to capture images with depth information for the generation of a 3D mesh sculpture. For example, in other implementations, a stereo camera, a range camera (e.g., a Kinect camera), and/or another type of camera that obtains depth information may be used.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computing device, comprising:
   capturing, by the computing device, one or more images from a depth camera, wherein the one or more images include depth information;
   generating, by the computer device, an initial sculpture for an entity in the captured one or more images;
   performing, by the computer device, a ray casting process on the generated initial sculpture using the depth information; and
   deforming, by the computer device, the initial sculpture based on the ray casting process to generate a sculpture for the entity; and
   wherein the initial sculpture includes a mesh polygon with vertices and triangular faces, and wherein performing the ray casting process on the generated initial sculpture using the depth information includes:
   casting a ray from an origin point to a particular data point included in the depth information;
   determining an intersection point of the cast ray with a particular triangular face of the mesh polygon;
   calculating a force vector to move the intersection point to the particular data point; and
   determining a vertex force vector for a vertex of the particular triangular face based on the calculated force vector.

2. The method of claim 1, wherein the performing the ray casting process and deforming the initial sculpture are performed using particular ones of the one or more images.

3. The method of claim 1, wherein deforming the initial sculpture based on the ray casting process to generate a sculpture for the entity includes:
   adding up vertex force vectors for a particular vertex of the mesh polygon; and
   deforming the initial sculpture by moving the particular vertex based on the added up force vectors.

4. The method of claim 1, wherein the captured one or more images include color information, the method further comprising:
   determining color information for the particular triangular face based on the color information.

5. The method of claim 4, wherein determining the color information for the particular triangular face based on the color information includes:
   generating a three dimensional UV map based on the color information; and mapping the generated three dimensional UV map onto the sculpture for the entity.

6. The method of claim 1, further comprising:
determining whether the calculated force vector has a magnitude less than a force magnitude threshold; and
ignoring the calculated force vector in determining the vertex force vector when the calculated force vector has a magnitude less than a force magnitude threshold.

7. The method of claim 1, further comprising:
determining an angle between the calculated force vector and the particular triangular face;
determining whether the angle is less than an angle threshold; and
ignoring the calculated force vector in determining the vertex force vector, when the angle is less than the angle threshold.

8. The method of claim 1, further comprising:
assigning a stability value to the vertex, wherein the stability value is based on a measure of how much the vertex has been deformed; and
scaling the vertex force vector based on the assigned stability value.

9. The method of claim 1, further comprising:
determining that an edge associated with the vertex is shorter than an edge length threshold; and
adding an edge force, parallel to the edge, to the vertex force vector, in response to determining that the edge associated with the vertex is shorter than the edge length threshold.

10. The method of claim 1, further comprising:
eliminating a component of the vertex force vector that is not parallel to the cast ray.

11. The method of claim 1, further comprising:
determining that the vertex is associated with at least two edges that form an angle that is smaller than an angle threshold; and
smoothing out the vertex by applying a force toward a midpoint between distant ends of the at least two edges with respect to the vertex.

12. The method of claim 1, wherein deforming the initial sculpture based on the ray casting process to generate a sculpture for the entity includes:
calculating a tension value for the vertex, wherein the tension value is based on a ratio of a magnitude of a sum of forces applied at the vertex to a sum of magnitudes of the forces applied at the vertex;
determining whether the tension value is higher than a tension threshold; and
tessellating the particular triangular face into two smaller triangular faces, when the tension value is higher than the tension threshold.

13. The method of claim 1, wherein deforming the initial sculpture based on the ray casting process to generate a sculpture for the entity includes:
determining that the particular triangular face is associated with an edge that is longer than an edge length threshold; and
tessellating the particular triangular face into two smaller triangular faces, when the edge is longer than the edge length threshold.

14. The method of claim 1, wherein deforming the initial sculpture based on the ray casting process to generate a sculpture for the entity includes:
determining that an edge associated with the particular triangular face is shorter than an edge length threshold; and
removing the edge from the mesh polygon, in response to determining that the edge is shorter than the edge length threshold.

15. The method of claim 1, wherein performing the ray casting process on the generated initial sculpture using the depth information includes:
using a graphics processing unit to perform the ray casting process.

16. A mobile communication device comprising:
logic configured to:
capture one or more images from a depth camera, wherein the one or more images include depth information;
generate an initial sculpture for an entity in the captured one or more images;
perform a ray casting process on the generated initial sculpture using the depth information; and
deform the initial sculpture based on the ray casting process to generate a sculpture for the entity; and
wherein the initial sculpture includes a mesh polygon with vertices and triangular faces, and wherein, when performing the ray casting process on the generated initial sculpture using the depth information, the logic is further configured to:
cast a ray from an origin point to a particular data point included in the depth information;
determine an intersection point of the cast ray with a particular triangular face of the mesh polygon;
calculate a force vector to move the intersection point to the particular data point; and
determine a vertex force vector for a vertex of the particular triangular face based on the calculated force vector.

17. The mobile communication device of claim 16, wherein, when deforming the initial sculpture based on the ray casting process to generate a sculpture for the entity, the logic is further configured to:
add up vertex force vectors for a particular vertex of the mesh polygon; and
deform the initial sculpture by moving the particular vertex based on the added up force vectors.

18. A non-transitory computer-readable memory device storing instructions executable by a processor, the non-transitory computer-readable memory device comprising:
one or more instructions to capture one or more images from a depth camera, wherein the one or more images include depth information;
one or more instructions to generate an initial sculpture for an entity in the captured one or more images, wherein the initial sculpture includes a mesh polygon with vertices and triangular faces;
one or more instructions to cast a ray from an origin point to a particular data point included in the depth information;
one or more instructions to determine an intersection point of the cast ray with a particular triangular face of the mesh polygon;
one or more instructions to calculate a force vector to move the intersection point to the particular data point;
one or more instructions to determine a vertex force vector for a vertex of the particular triangular face based on the calculated force vector; and
one or more instructions to deform the initial sculpture by moving the vertex based on the added up force vectors.

* * * * *